United States Patent [19]

Corbin, Jr.

[11] 4,066,791
[45] Jan. 3, 1978

[54] CHEESE MANUFACTURE WITH ACIDIFIED POWDERED MILK

[75] Inventor: Edgar A. Corbin, Jr., Manchester, Mo.

[73] Assignee: Diamond Shamrock Corporation, Cleveland, Ohio

[21] Appl. No.: 711,605

[22] Filed: Aug. 4, 1976

[51] Int. Cl.² .................. A23C 19/02; A23C 9/00
[52] U.S. Cl. ........................ 426/39; 426/40; 426/582; 426/588
[58] Field of Search .............. 426/36, 39, 61, 40, 426/580, 582, 583, 588

[56] References Cited

U.S. PATENT DOCUMENTS

| 1,000,686 | 8/1911 | Merrell | 426/588 |
|---|---|---|---|
| 3,080,236 | 3/1963 | Ferguson, Jr. | 426/61 |
| 3,620,768 | 11/1971 | Corbin, Jr. | 426/40 X |
| 3,792,171 | 2/1974 | Little | 426/582 X |
| 3,793,465 | 2/1974 | Bohren | 426/43 X |
| 3,953,610 | 4/1976 | Little | 426/40 X |

*Primary Examiner*—David M. Naff
*Attorney, Agent, or Firm*—Neal T. Levin; Leslie G. Nunn

[57] ABSTRACT

Sufficient powdered milk and food grade acid are mixed together to obtain an acidified powdered milk mixture which can be reconstituted with water or milk to obtain an acidified reconstituted milk having a pH of from about 4.95 to about 5.3. The mixture may be produced with solid or liquid food grade acids. Acidified reconstituted milk prepared from the mixture does not contain precipitated casein, is not denatured and is suitable for use in cheesemaking.

14 Claims, No Drawings

CHEESE MANUFACTURE WITH ACIDIFIED POWDERED MILK

BACKGROUND OF THE INVENTION

1. Field of the Invention

This invention relates to an improved process for the manufacture of acid cheese curd in conventional dairy equipment.

2. Description of the Prior Art

The prior art describes various processes for preparing cheese curd from chemically acidified milk. For example, U.S. Pat. No. 2,982,654 (Hammond, et al.) teaches a cheese curd process wherein an acidogen is added to milk in conjunction with a proteolytic enzyme. This process, which uses acidogen alone without first acidifying the milk, has the disadvantage that it requires too long a period of time to form a curd. U.S. Pat. No. 3,172,767 (Foster, et al.) teaches a process wherein milk is acidified at 4°–5° C and then heated to 29°–82° C, whereupon a proteolytic enzyme is added, to produce a sweet cheese curd. This process does not produce an acid cheese curd and also requires additional equipment for cooling the milk. U.S. Pat. No. 3,406,076 (Little) teaches a process wherein milk must be refrigerated before addition of free acid and requires above normal amounts of proteolytic enzyme.

U.S. Pat. No. 3,620,768 (Corbin) teaches the acidification of cold milk. British Pat. No. 1,247,415 (Battelle) also teaches acidification of cold milk, and moreover states at page 3, lines 3 through 7, that: "It is well known that when milk is acidified at a temperature of about 70° F (21° C) to a pH of about 5.20 or below, it coagulates almost instantly into a granular water coagulation, totally unfit for making cheese." This disclosure is supported, generally, in "Principles of Dairy Chemistry" by Robert Jenness and Stuart Patton (John Wiley and Sons, New York, 1959) at page 310, where it is stated: ". . . sensitivity of casein to coagulation by heat is enormously increased by decreasing the pH a few tenths of a unit below the normal value for milk ."

U.S. Pat. No. 3,882,250 (Loter, et al.) teaches that when milk is acidified at 15°–30° C under vigorous agitation, its pH can be reduced to from about 4.95 to 5.35 without precipitating casein or denaturing the milk so that curd does not form. Acidogen and proteolytic enzyme are then added to the warm acidified milk maintained at these temperatures in a quiescent state for from about 30 minutes to 4 hours to form a curd. The curd is then cut, cooked and used in cheesemaking. In this process, milk temperature remains approximately constant from the time the acidifying agent is added until after the curd is formed so need for complex temperature control and special heating or cooling equipment is eliminated.

SUMMARY OF THE INVENTION

A food grade acid is intimately mixed with a powdered milk such as nonfat milk solids (skim milk powder) in such proportions to obtain a powdered mixture which on reconstitution with water or milk produces an acidified reconstituted milk having a pH of from about 4.95 to about 5.30. Either solid or liquid food grade acids may be used. Reconstitution may be effected by any suitable means such as a recirculating powder funnel using a temperature in the range of from about 5° to about 40° C preferably of from about 10° to about 29° C to obtain a stable, normal acidified reconstituted milk that does not contain any specks of precipitated casein. The acidified reconstituted milk may be converted immediately to direct set cheese curd at a temperature of from about 26° to about 40° C preferably at from about 27° to about 32° C by adjusting the temperature if necessary, then adding an acidogen such as D-glucono-delta-lactone together with rennet extract in the proper amounts and thereafter allowing the heated acidified milk, acidogen and rennet mixture to remain in a quiescent state for about 45 minutes to about 2 hours. A normal cheese curd forms which may be cut, cooked, washed, drained and used in cheesemaking.

DESCRIPTION OF THE PREFERRED EMBODIMENTS

Acidified powdered milk produced by this invention may be used to manufacture cottage cheese, baker's cheese, quark, cream cheese, Neufchatel cheese and the like. The acidified powdered milk may be reconstituted with water or a fluid milk product such as fresh skim milk, skim milk having about 1–4% by weight or more added NFMS (Grade A, Low Heat, nonfat milk solids), whole milk, milk-cream mixtures, half milk and half cream, reconstituted condensed milk and the like or by reconstitution of powdered milk. The fluid milk product may be medium or high butterfat milk or cream having as much as 20% butterfat as well as milk having a butterfat content of from about 0.01% to about 5% by weight and a total nonfat solids content of from about 8% to about 16% by weight. A useful reconstituted acidified fluid milk should have a pH of from about 4.95 to about 5.3 and can be converted to a direct set cheese curd by adding suitable acidogens and/or proteolytic enzymes.

Food grade acids useful in the preparation of acidified powdered milk include:

citric acid
tartaric acid
malic acid
adipic acid
fumaric acid
succinic acid
succinic anhydride
glutaric acid
glutaric anhydride
lactic acid
phosphoric acid
hydrochloric acid
acetic acid
sulfuric acid.

Sufficient acid is mixed with the powdered milk to obtain a powdered milk mixture which will produce a reconstituted milk having a pH of from about 4.95 to about 5.30. For example, 0.25 to 0.35% by weight of solid acid based on the weight of reconstituted milk may be used. Finely divided solid food grade acid particles may be mixed with the powdered milk or liquid food grade acids may be sprayed on the powdered milk and mixed. The acid and powdered milk mixture is blended until uniform. Any suitable mixing and/or blending equipment may be used.

The powdered milk and acid mixture may be reconstituted with either water or milk by any suitable means such as a recirculating powder funnel which will produce an acidified reconstituted milk having a pH of from about 4.95 to about 5.30 without precipitating casein or denaturing the milk so that a curd will not subsequently form.

After reconstitution, the acidified reconstituted milk may be maintained at about the same temperature and from about 0.0 parts to about 0.5 parts by weight preferably about 0.2 to about 0.5 parts by weight of at least one acidogen per 100 parts by weight of acidified milk and from about 0.01 to about 0.05 parts by weight of aqueous proteolytic enzyme solution per 100 parts by weight of acidified milk are added to the milk. The resulting mixture is agitated during and after acidogen and enzyme addition until uniform. Then the acidified milk is maintained in a quiescent state at about the same temperature until the acid liberated from the acidogen and/or the action of the proteolytic enzyme coagulate the milk. From about 45 minutes to about 2 hours after addition of the acidogen and proteolytic enzyme, a cuttable cheese curd forms.

An acidogen such as D-glucono-delta-lactone, the low melting lactide (m.p. 41°–42° C) of lactic acid, acetic anhydride, heptonolactone (the lactone of glucoheptonic acid) or the like can be used. Preparation of this low melting lactic acid lactide is described by U.S. Pat. No. 2,982,654, Hammond and Deane issued May 2, 1961.

The proteolytic enzyme can be commercial rennin, Rennet, a diluted rennet extract, a pepsin-rennin mixture, a vegetable-derived enzyme clotting agent or the like. Other enzymes such as pepsin, papain and ficin may be used alone or in combination with rennin, the preferred enzyme. Rennin is obtained from the stomach of suckling calves. Rennet, a commercial dried extract containing rennin can also be used. See Merck Index, page 911 (Merck & Co., Inc. — 1968 — 8th Ed). The Rennet of commerce is usually a solution of the enzyme rennin, stabilized, and with preservatives added and standarized in strength to a certain coagulating or clotting power. Useful commercial aqueous rennin solutions include Hansen's Rennet Extract and Hansen's Cottage Cheese Coagulator available from Hansen's Laboratory, Inc., Milwaukee, Wis. Another enzyme that may be used is produced by pure culture fermentation of the organism Mucor Miehei. This enzyme is available commercially in units standardized to rennet extract.

The heated, acidified milk containing acidogen and/or enzyme is then allowed to remain in a quiescent state at just in excess of 16° to about 40° C with the optimum temperature being about 26° to 40° C for about 45 minutes to about 2 hours to obtain a cuttable cheese curd.

The cheese curd is then cut and cooked. It can be cut into large (¾-inch, ⅝-inch ½ inch) or small (⅜-inch or ¼-inch) cubes. The cooking rate in the process of this invention is faster than the cooking rate in the cultured process, that is, about 30 minutes to about 90 minutes compared to about 90 minutes to about 150 minutes. Draining and washing of the cooked curd can be carried out using conventional cheesemaking procedures.

If desired, orthophosphates may be used to complex whey proteins. Use of condensed phosphates is described in my copending application entitled "Cheese Process," U.S. Pat. No. 711,606, filed on Aug. 4, 1976. These salts may be added to the water, milk or milk powder during processing.

To produce cottage cheese, the acid cheese curd is processed with the additional steps of:

1. cutting the curd into cubes,
2. expressing the whey from the curd,
3. cooking and stirring the curd for from about 30 minutes to about 90 minutes at a temperature of from about 38° to about 65° C, and
4. washing and draining the curd.

To prepare baker's cheese, the acid cheese curd is processed with the additional steps of:

1. breaking up the curd,
2. bagging the curd and expressing the whey, and
3. hanging and draining the bagged curd for about 1 hour, to express further whey.

To produce Neufchatel cheese or cream cheese, the acid cheese curd is processed with the additional step of:

1. cutting the curd,
2. cooking and stirring the curd until the temperature reaches about 55° C and then continuing cooking for about 15 additional minutes,
3. cooling the curd to about 15° C,
4. draining the curd overnight at about 3°–4° C to obtain a dry, soft curd,
5. mixing the dry, soft curd with sufficient lactic acid to reduce the pH of the curd to 4.60 and
6. blending the curd into a smooth homogeneous cheese mass.

In cream cheese manufacture, the original milk should contain enough cream so as to have a fat content of about 10.5 to about 11.5 percent. In making Neufchatel cheese, the original milk should contain enough cream so as to have a fat content of about 5 to about 6 percent.

For a fuller understanding of the nature and objects of this invention, reference may be made to the following examples. These examples are given merely to illustrate the invention and are not to be construed in a limiting sense. All parts, proportions and quantities are by weight unless otherwise indicated. The terms g, ml. ° C, ° F and NFMS are used to indicate grams, milliliters, degrees centrigrade, degrees Fahrenheit and nonfat milk solids respectively in these examples.

EXAMPLE I

This experiment demonstrates preparation of cheese curd using a pre-acidified milk powder.

A mixture of 1.2 g fumaric acid, 1.2 g citric acid and 0.8 g succinic anhydride was ground in a mortar to a fine powder. This powder was intimately mixed into 100 g of low heat, nonfat milk solids (skim milk powder).

To 1 qt of water at 24° C were added:

1.1 g monoammonium phosphate
1.1 g disodium phosphate
1.1 g monocalcium phosphate
0.5 g magnesium chloride.

This water solution had a pH of 6.17.

To the water solution, at 24° C, was added the pre-acidified nonfat milk solids mixture prepared above using vigorous mechanical agitation to obtain a reconstituted acidified skim milk having a pH of 5.0.

Warmed the milk to 32° C where it had a pH of 4.9. To the warm milk at 32° C added, with stirring, 4 g D-glucono-delta lactone (acidogen) which was dissolved in 20 ml of water. Then mixed 0.24 ml cottage cheese coagulator (dilute rennet extract, Hansen's) with 5 ml water and added this mixture to the warm skim milk. Stirred the mixture for 2 min to obtain a milk having a pH of 4.89. Allowed milk to set undisturbed for 1 hr at 32° C. A smooth, medium firm, normal cottage cheese curd formed.

Cut curd into ⅜ inch cubes. Whey exuded in a normal manner and had a pH of 4.7. Heated the cut curds, cooked and stirred for 25 min to a temperature of 53° C. Curds cooked and shrunk in a normal manner. Drained whey having a pH of 4.55. Washed curds 3 times with successively colder water; let drain. Weight of drained curds was 142 g representing a yield of 14.56% or 1.42 lbs curd per lb of NFMS. Moisture in curds was 79.2%. Calculated to 80% moisture, weight of curds was 147.7. Yield of 80% moisture cheese curd was 15.15% or 1.47 lbs curd per lb NFMS.

EXAMPLE II

This example demonstrates preparation of cheese curd using a preacidified skim milk powder.

Charged 30 gal of water having a pH of 9.3 into a cheese vat. Then added 144 g mono sodium phosphate, 84 g mono calcium phosphate, 360 g sodium polyphosphate ("Vitrafos"— Stauffer Chemical Co.), and 24 ml of an antifoam solution to the water. Water pH after this addition was 5.85. Added 15 pounds of NFMS (nonfat milk solids – powdered skim milk solids) to the water using a recirculating, powder funnel system, to reconstitute the skim milk. Reconstituted milk had a pH of 6.3.

A pre-acidified skim milk powder was prepared by intimately mixing the following finely ground food-grade acids with a second 15 pound portion of NFMS: 120 g tartaric acid, 120 g citric acid, 72 g malic acid and 84 g adipic acid. The pre-acidified skim milk powder was reconstituted using the reconstituted skim milk prepared in the preceding paragraph at 18° C and the powder funnel system. The reconstituted acidified skim milk pH was 5.11. The skim milk was then warmed with agitation from 18° to 36° C where its pH was 5.09.

The small amount of denatured foam present on the surface of the reconstituted acidified skim milk was removed and discarded. A 1-quart sample of the acidified skim milk was set aside for 30 min and then carefully decanted. There was no sediment present in the sample and no specks of precipitated casein were found in the sample.

Added, with stirring, to the vat of heated acidified milk, 480 g of acidogen (D-glucono-delta-lactone) and stirred for 2 min. Then added, with stirring, to the vat, 36 ml cottage cheese coagulator (dilute rennet extract, Hansen's) diluted in 200 ml water and stirred for 2 min. Milk pH was 5.05.

Allowed acidified skim milk to set undisturbed for 1 hr. A normal, firm, cottage cheese type curd formed. The curd was cut with ⅜ inch wire knives. Cut was very clean, smooth and normal. Whey exuded from curd normally. Whey pH was 4.85. Curd was allowed to set for 15 minutes to "heal" and 30 ml of 85% phosphoric acid diluted with 1 qt warm water was added to the cut curd. Then stirred the cut curd gently and cooked curd slowly to 52° C. The cooked curd was slightly soft, but was an acceptable large curd type cottage cheese curd. Whey pH was 4.62. Drained whey, washed curd 3 times with water, trenched curd and drained for 30 min.

Weight of drained curd was 56.75 lbs. Yield, based on 280 lbs skim milk was 20.27% or 1.89 lbs of curd per each 1 lb of NFMS used. Moisture in the curd was 79.4% (80% is legal maximum). Weight of the curd calculated to an 80% moisture level was 58.45 lb. Yield of curd was 20.87% or 1.95 lb of curd per each 1 lb of NFMS (powdered skim milk) used.

EXAMPLE III

This example demonstrates preparation of cheese curd using a pre-acidified skim milk powder.

To 113 g of low heat, nonfat milk solids (skim milk powder) being stirred very vigorously in a food blender, was added dropwise 2.2 ml of undiluted 85% phosphoric acid. A free-flowing acidified skim milk powder was obtained that did not change in color, or odor, and did not "cake" when stored overnight.

The pre-acidified skim milk powder was reconstituted in 1 qt of water at 16° C by stirring vigorously with a mechanical agitator to obtain an acidified skim milk having a pH of 5.12. The acidified reconstituted skim milk was warmed to 32° C and was normal in appearance with no specks of precipitated casein.

Added 4 g of D-glucono-delta-lactone (acidigen) dissolved in 20 ml water to the milk and stirred for 1 min. The added 0.15 ml cottage cheese coagulator diluted with 5 ml water to the milk and stirred for 1 min. Allowed the milk to set undisturbed for 80 min at 32° C. A medium, firm cottage cheese type curd formed.

Cut curd into ⅜ inch cubes. Curd cut was smooth, clean and normal. Whey exuded slowly. The pH of whey was 4.55. Cooke and stirred the cut curds in usual manner to 49° C. Curd cooked and firmed into an acceptable cottage cheese curd having a clean, pleasant and acceptable taste.

EXAMPLE IV

A mixture of 1.6 g fumaric acid and 1.6 g citric acid was ground in a mortar to a fine powder. This powder was intimately mixed into 57 g of nonfat milk solids (skim milk powder).

To 1 qt of water at 22° C were added:
1.2 g monoammonium phosphate
0.5 g monocalcium phosphate
0.6 g disodium phosphate
1.1 g sodium polyphosphate ("Vitrafos," Stauffer Chemical Co.).

This water solution had a pH of 6.3.

To the water solution added, with stirring, 57 g of regular, unacidified, nonfat milk solids to obtain a reconstituted skim milk having a pH of 6.4.

To the reconstituted milk at 22° C added with vigorous mechanical agitation, the 57 g of pre-acidified nonfat milk solids prepared above to obtain an acidified reconstituted skim milk having a pH of 5.13. Warmed the milk, with stirring, to 330° where its pH was 5.15.

Dissolved 4 g acidogen (D-glucono-delta-lactone) in 20 ml water, added and stirred into the warmed skim milk. The diluted 0.25 ml cottage cheese coagulator (dilute rennet extract, Hansen's ) with 5 ml water, added to skim milk and stirred for 1 min. Allowed the milk to set undisturbed for 70 min. A firm, normal, cottage cheese curd formed.

Cut curd into ⅜ inch cubes. Whey exuded slightly slower than normal. The whey pH was 4.85. Warmed the cut curds, cooked and stirred to a temperature of 52° C. Curds firmed well, were heavy, settled easily and had no tendency to mat or stick together. Drained whey having a pH of 4.7. Washed curds 3 times with successively colder water and drained. Weight of drained curds was 190 g representing a yield of 17.9% or 1.66 lbs curd per 1 lb NFMS. Moisture in curd was 77.28%. Calculated to an 80% moisture basis, weight of curds was 216 g representing a yield of 20.3% or 1.89 lbs curd per 1 lb of NFMS.

EXAMPLE V

A mixture of 1.6 g tartaric acid, 1.0 g citric acid and 0.6 g malic acid was ground in a mortar to a fine powder. This powder was intimately mixed with 57 g nonfat milk solids (skim milk powder).

To 1 qt of water at 18° C were added:
1.2 g monosodium phosphate
0.7 g monocalcium phosphate
0.5 ml of an antifoam solution (food grade) and
2.1 g sodium polyphosphate ("Vitrafos," Stauffer Chemical Co.).

The water solution had a pH of 5.65.

To the water solution was added, with stirring, 57 g of regular, unacidified, nonfat milk solids to obtain a reconstituted milk having a pH of 6.25.

Then added, with vigorous mechanical agitation, the 57 g of preacidified NFMS to the milk at 18° C to obtain an acidified, reconstituted, skim milk having a pH of 5.12. Warmed the milk, with stirring, to 38° C where its pH was 5.17. Milk was rich in appearance, shiny, smooth, with no specks of precipitated casein.

Added 5 g of D-glucono-delta-lactone (acidogen) to the milk at 37° C and stirred for 1 min. Diluted 0.25 ml cottage cheese coagulator (dilute rennet extract, Hansen's) with 10 ml water, added to the milk and stirred for 1 min to obtain a skim milk having a pH of 5.1. Allowed the milk to set undisturbed at 37° C for 1 hr. A firm, smooth, cottage cheese curd formed.

Cut curd into ⅜inch cubes. Whey having a pH of 4.84 exuded easily. Warmed, cooked and stirred curds to a final temperature of 54° C. Drained whey having a pH of 4.54. Washed curds 3 times with successively colder water, then drained. Weight of drained curds was 237 g representing a yield of 22.36% or 2.08 lbs curd per lb NFMS. Moisture in curd was 81.2%. Calculated to an 80% moisture basis, weight of curd was 222.8 g representing a yield of 21% or 1.95 lbs curd per lb of NFMS.

While the invention has been described with reference to certain specific embodiments thereof, it is understood that it is not to be so limited since alterations and changes may be made therein which are within the full intended scope of the appended claims.

What is claimed is:

1. An acid cheese curd making process comprising:
   A. spraying on powdered milk an acidifying amount of a liquid food grade acid sufficient to produce an acidified powdered milk mixture which on reconstitution with water at from from 5° to about 40° C produces an acidified milk having a pH from about 4.95 to about 5.3, thereafter
   B. reconstituting the acidified powdered milk mixture with water at from about 5° to about 40° C to produce an acidified milk, then
   C. maintaining the acidified milk at about 26° to about 40° C, with the proviso that if the acidified milk is below 26° C, the milk is heated to about 26° to about 40° C, thereafter
   D. adding to the acidified milk at about 26° to about 40° C from about 0.01 to about 0.05 parts by weight of proteolytic enzyme and, optionally, an acidogen in an amount up to about 0.5 parts by weight per 100 parts by weight of the acidified milk; and then
   E. allowing the cheese, milk from step D to stand quiescent at from about 26° to about 40° C for about 45 minutes to about 2 hours so as to form an acid cheese curd suitable for making cottage chees, bakers' cheese, quark cheese, cream cheese and Neufachatel cheese.

2. A process according to claim 1 with the additional steps of
   F. cutting the acid cheese curd into cubes,
   G. expressing whey from the curd,
   H. cooking and stirring the curd for from about 30 minutes to about 90 minutes at a temperature of from about 38° to about 65° C, and
   I. washing and draining the curd to obtain a cottage cheese curd.

3. A process according to claim 1 with the additional steps of
   F. breaking up the cuttable acid cheese curd,
   G. bagging the curd and expressing whey therefrom, and
   H. hanging and draining the bagged curd for about 1 hour to help express further whey, to obtain a bakers' cheese curd.

4. A process according to claim 1 with the additional steps of
   F. cutting the cuttable acid cheese curd,
   G. cooking and stirring the curd until whey temperature reaches about 55° C and then continuing cooking for about 15 minutes additionally,
   H. cooling the curd to about 15° C,
   I. draining the curd overnight at about 3° C to obtain a dry, soft curd, and
   J. mixing the dry, soft curd with sufficient lactic acid to reduce pH of the curd to 4.6 and blending the curd into a smooth homogeneous cheese mass, with the proviso that the milk of step (A) is part milk and part cream so as to have a fat content of
      a. from about 5 to about    percent for the production of Neufchatel cheese, or
      b. from about 10.5 to about 11.5 percent for the production of cream cheese.

5. The process of claim 1 wherein from about 0.2 to about 0.5 parts of weight of acidogen is added.

6. The process of claim 1 wherein the acidified powdered milk mixture is reconstituted at a temperature of from about 10° to about 29° C.

7. The process of claim 1 wherein the liquid food grade acid is phosphoric acid.

8. An acid cheese curd making process comprising:
   A. spraying on powdered milk an acidifying amount of liquid food grade acid sufficient to produce an acidified powdered milk mixture which on reconstitution with milk at from about 5° to about 40° C produces an acidified milk having a pH from about 4.95 to about 5.3, thereafter
   B. reconstituting the acidified powdered milk mixture with milk at from about 5° to about 40° C to produce an acidified milk, then
   C. maintaining the acidified milk at about 26° to about 40° C, with the proviso that if the acidified milk is below 26° C, the milk is heated to about 26° to about 40° C, thereafter
   D. adding to the acidified milk at about 26° to about 40° C from about 0.01 to about 0.05 parts by weight of proteolytic enzyme and, optionally, an acidogen in an amount up to about 0.5 parts by weight per 100 parts by weight of the acidified milk; and then
   E. allowing the acidified milk from step D to stand quiescent at from about 26° to about 40° C for about 45 minutes to about 2 hours so as to form an acid cheese curd suitable for making cottage cheese, bakers' cheese, quark cheese, cream cheese and Neufachatel cheese 9. A process according to claim 8 with the additional steps of
   F. cutting the acid cheese curd into cubes,
   G. expressing whey from the curd,
   H. cooking and stirring the curd for from about 30 minutes to about 90 minutes at a temperature of from about 38° to about 65° C, and
   I. washing and draining the curd to obtain a cottage cheese curd.

10. A process according to claim 8 with the additional steps of
    F. breaking up the cuttable acid cheese curd,
    G. bagging the curd and expressing whey therefrom, and
    H. hanging and draining the bagged curd for about 1 hour to help express further whey, to obtain a bakers' cheese curd.

11. A process according to claim 8 with the additional steps of
    F. cutting the cuttable acid cheese curd,
    G. cooking and stirring the curd until whey temperature reaches about 55° C and then continuing cooking for about 15 minutes additionally,
    H. cooling the curd to about 150° C,
    I. draining the curd overnight at about 3° C to obtain a dry, soft curd, and
    J. mixing the dry, soft curd with sufficient lactic acid to reduce pH of the curd to 4.6 and blending the curd into a smooth homogeneous cheese mass, with the proviso that the milk of step (A) is part milk and part cream so as to have a fat content of
       a. from about 5 to about 6 percent for the production of Neufchatel cheese, or
       b. from about 10.5 to about 11.5 percent for the production of cream cheese.

12. The process of claim 8 wherein from about 0.2 to about 0.5 parts by weight of acidogen is added.

13. The process of claim 8 wherein the acidified powdered milk mixture is reconstituted at a temperature of from about 10° to about 29° C.

14. The process of claim 8 wherein the liquid food grade acid is phosphoric acid.

* * * * *